(12) United States Patent
Babakri et al.

(10) Patent No.: US 11,747,241 B2
(45) Date of Patent: Sep. 5, 2023

(54) METHOD OF TESTING LONGITUDINAL SUBMERGED ARC WELDED PIPE SUSCEPTIBILITY THROUGH-THICKNESS HYDROGEN CRACKING

(71) Applicant: SAUDI ARABIAN OIL COMPANY, Dhahran (SA)

(72) Inventors: Khalid Ali Babakri, Dhahran (SA); Mohammed A. Al-Anezi, Dhahran (SA); Saad M. Al-Muaili, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 207 days.

(21) Appl. No.: 17/188,811

(22) Filed: Mar. 1, 2021

(65) Prior Publication Data
US 2022/0276135 A1    Sep. 1, 2022

(51) Int. Cl.
*G01N 1/28* (2006.01)
*G01N 3/08* (2006.01)

(52) U.S. Cl.
CPC ............ *G01N 1/28* (2013.01); *G01N 3/08* (2013.01)

(58) Field of Classification Search
CPC .. G01N 1/28; G01N 3/08; G01N 3/20; G01N 2001/2873; G01N 2203/0062;
(Continued)

(56) References Cited

U.S. PATENT DOCUMENTS 8,042,399 B2 * 10/2011 Pasquali ............. G01N 29/262
73/622
8,513,020 B2 * 8/2013 Hehn ...................... G01N 3/20
422/53
(Continued)

FOREIGN PATENT DOCUMENTS

CN        102049622 A    5/2011
CN        203216822 U    9/2013
(Continued)

OTHER PUBLICATIONS

Law, M. et al.; "Test Methods to Assess Transverse Weld Metal Hydrogen Cracking"; Advance Materials Research; vols. 41-42; Apr. 8, 2008; pp. 427-434 (8 pages).
(Continued)

*Primary Examiner* — Freddie Kirkland, III
(74) *Attorney, Agent, or Firm* — Osha Bergman Watanabe & Burton LLP

(57) ABSTRACT

A method including obtaining a metal pipe with a longitudinal submerged arc weld, an axis of the longitudinal submerged arc weld being oriented parallel to a rotationally symmetric axis of the metal pipe and cutting a first test beam and a second test beam from the metal pipe with each test beam extending on both sides of the axis of the longitudinal submerged arc weld and has a cuboid shape. The method further including forming a double-beam assembly by clamping two spacers between the first and second test beams such that the two spacers are symmetrically disposed at an equal distance on either side the longitudinal submerged arc weld. The method further including immersing the double-beam assembly in a liquid test solution for a predetermined period of time before removing it from the liquid test solution and disassembling the double-beam. The
(Continued)

method further including examining the first and the second test beam using a metallographic sectioning method.

20 Claims, 9 Drawing Sheets

(58) Field of Classification Search
CPC ... G01N 2203/0264; G01N 2203/0296; G01N 2203/0423; G01N 2203/0641; G01N 1/286; G01N 1/04
See application file for complete search history.

(56) References Cited

U.S. PATENT DOCUMENTS

| | | | |
|---|---|---|---|
| 9,506,862 B2* | 11/2016 | Kobayashi | B23K 26/032 |
| 11,235,427 B2* | 2/2022 | Al-Muaili | B23K 31/12 |
| 2006/0100834 A1 | 5/2006 | Davis | |
| 2011/0136239 A1 | 6/2011 | Hehn et al. | |
| 2018/0364138 A1 | 12/2018 | Traidia et al. | |
| 2021/0229221 A1* | 7/2021 | Al-Muaili | G01M 5/0033 |

FOREIGN PATENT DOCUMENTS

| | | |
|---|---|---|
| CN | 106226167 A | 12/2016 |
| CN | 107505256 A | 12/2017 |
| CN | 209878483 U | 12/2019 |
| JP | H06-331530 A | 12/1994 |
| JP | 2010236930 A | 10/2010 |

OTHER PUBLICATIONS

Cheng, F. J. et al.; "New Method of Assessing Susceptibility of Welds to Transverse Cracking"; Science and Technology of Welding and Joining; vol. 21; No. 1; Jan. 1, 2006; pp. 36-40 (5 pages).

NACE International; "Laboratory Test Procedures for Evaluation of SOHIC Resistance of Plate Steels Used in Wet H2S Service"; NACE Standard TM0103-2003; Item No. 21242; 2003 (28 pages).

NACE International; "Evaluation of Pipeline and Pressure Vessel Steels for Resistance to Hydrogen-Induced Cracking"; Nace TM0284-2016; Item No. 21215; 2016 (36 pages).

ASTM International; "Standard Practice for Preparation and Use of Bent-Beam Stress-Corrosion Test Specimens" ASTM G39-99; 2011 (8 pages).

First Examination Report issued in corresponding Saudis Application No. 122430722 dated Dec. 14, 2022 (10 pages).

Evaluation of Pipeline and Pressure Vessel Steels for Resistance to Hydrogen-Induced Cracking, NACE Standard TM0284-2003, (Jan. 17, 2003), pp. 1-12 (15 pages).

* cited by examiner

METHOD OF TESTING LONGITUDINAL SUBMERGED ARC WELDED PIPE SUSCEPTIBILITY THROUGH-THICKNESS HYDROGEN CRACKING

BACKGROUND

Longitudinal submerged arc welding is a common process in the manufacture of metal pipes, including steel pipes, particularly those requiring large wall thickness due to high anticipated pressure differentials between the interior and exterior of the pipe. The production process begins with a long, flat metal slab which is then heated and formed into a pipe with a circular cross-section by bringing the external edges of the slab into contact. The edges are then sealed together with a weld along the axis of the pipe.

Hydrogen-induced cracking (HIC) is a hazard for longitudinal submerged arc welded pipe used in oil and gas pipelines and related installations. This hazard may be particularly severe when pipelines convey liquids with high hydrogen sulfide (H2 S) concentrations, sometimes referred to as "sour" liquids. Through-thickness cracks, which penetrate the full thickness of the pipe wall, are of special concern because of their potential to allow the liquids carried by the pipeline to leak to the environment. The longitudinal submerged arc weld (LSAW) itself, and the heat affected zone on either side of the weld, may be especially prone to through-thickness cracks. Thus, a method and apparatus for examining samples of longitudinal submerged arc welded pipe prior to installation to determine their resistance to hydrogen-induced through-thickness cracking is of value.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method including obtaining a metal pipe with a longitudinal submerged arc weld, an axis of the longitudinal submerged arc weld being oriented parallel to a rotationally symmetric axis of the metal pipe and cutting a first test beam and a second test beam from the metal pipe with each test beam extending on both sides of the axis of the longitudinal submerged arc weld and has a cuboid shape. The method further includes forming a double-beam assembly by clamping two spacers between the first and second test beams such that the two spacers are symmetrically disposed at an equal distance on either side the longitudinal submerged arc weld. The method further includes immersing the double-beam assembly in a liquid test solution for a predetermined period of time before removing it from the liquid test solution and disassembling the double-beam. The method further including examining the first and the second test beam using a metallographic sectioning method.

In general, in one aspect, embodiments relate to a testing apparatus including a first test beam and a second test beam both cut from a single metal pipe having a longitudinal submerged arc weld therein. Each test beam includes a portion of the longitudinal submerged arc weld and portions of the metal pipe extending on both sides of the longitudinal submerged arc weld. The testing apparatus further includes two spacers positioned between the first and second test beam positioned equidistant from the portion of the longitudinal submerged arc weld and two clamps that clamp together the distal end portions of the first and the second test beam. These two clamps are selectively tightenable to cause a desired deflection of the first and second test beams around the two spacers.

Other aspects and advantages of the claimed subject matter will be apparent from the following description and the appended claims.

BRIEF DESCRIPTION OF DRAWINGS

Specific embodiment of the disclosed technology will now be described in detail with reference to the accompanying figures. Like elements in the various figures are denoted by like reference numerals for consistency.

DETAILED DESCRIPTION

In the following detailed description of embodiment of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein relate to a novel method and apparatus and a method for testing a portion of a longitudinal submerged arc weld (LSAW) and for determining its susceptibility to hydrogen-induced through-thickness cracking. When applied to a sample taken from a segment of metal pipe, the disclosed apparatus and method assists a user in determining whether the corrosion characteristics of a metal pipe make the metal pipe suitable for storing or transporting a fluid rich in hydrogen sulfide, such as some type of crude oil and natural gas.

Figure 1A:
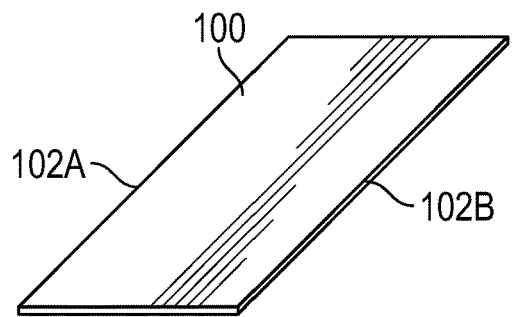
FIGS. 1A-1C show a method of pipe forming using longitudinal submerged arc welding.
Figure 1B:
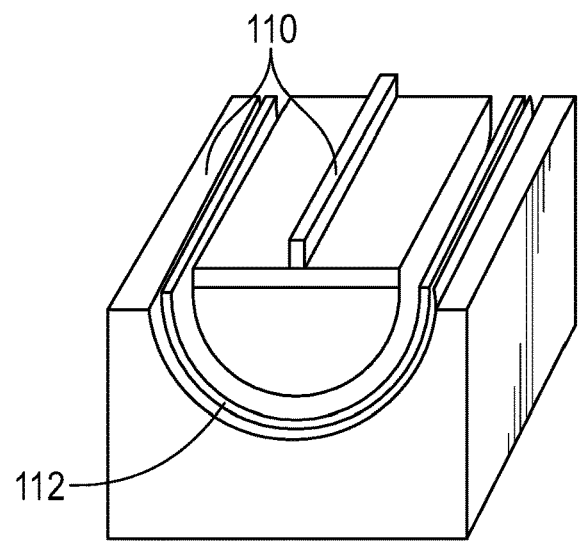
Figure 1C:
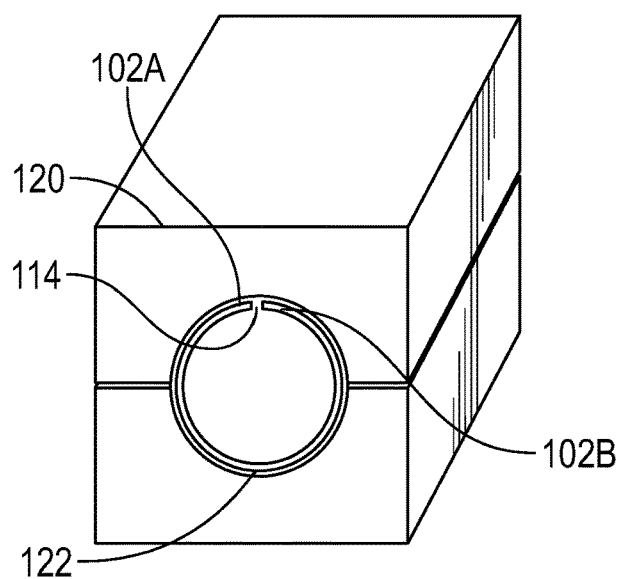

FIG. 1 shows the first stages in the manufacture of metal pipe that may be a steel pipe. FIG. 1A shows a metal plate stock (100) which may form the input to the manufacturing process. The metal plate stock may be a steel plate stock (100) and may have a length approximately equal to the desired length of the finished pipe, a width measured between a lateral edge (102A) and a lateral edge (102B) approximately equal to the desired circumference of the finished pipe, and a thickness approximately equal to the desired wall thickness of the finished pipe. The metal plate stock (100) may be heated an inserted into a "U" press (110), as shown in FIG. 1B, to generate a curved metal plate (112). The curved metal plate (112) may be inserted into an "O" press (120), as shown in FIG. 1C, to produce a circular metal pipe (122) with the lateral edges (102A, 102B) in proximity to one another but separated by a groove (114).

Figure 2:
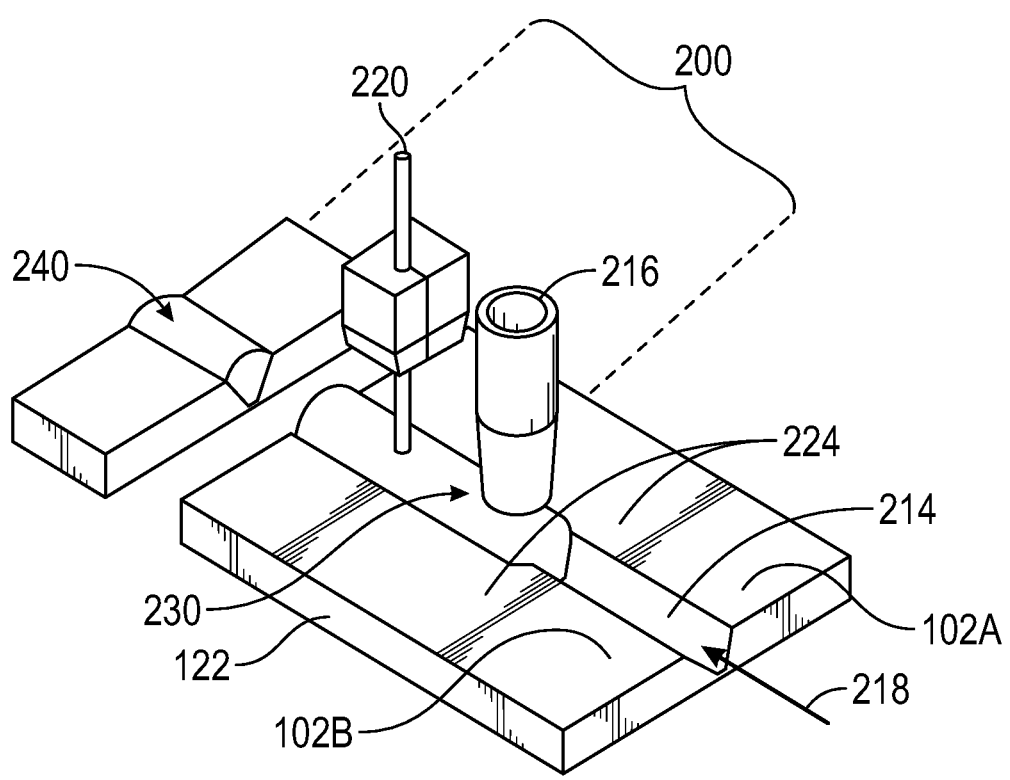
FIG. 2 shows a method of pipe forming using longitudinal submerged arc welding.

FIG. 2 shows the joining of the lateral edges (102A, 102B) of the circular pipe (122) with a longitudinal submerged arc welding device (200). A flux layer (230) is inserted into the groove (214) from a flux hopper (216) that traverses the longitudinal axis of the groove (218). An electrode wire (220) traverses the longitudinal axis of the groove (218) behind the flux hopper (216), and an electric current is caused to flow through an electrode (220) into the flux layer (230) which generates heat and thereby melts the flux layer (230). A weld (240) forms as the melted flux layer (230) solidifies. The weld (240) connects the two lateral edges (102A, 102B). A heat-affected zone (HAZ) (224) may be formed on either side of the weld (240). A HAZ (224) is region of the metal pipe proximal to the lateral edges (102A, 102B) on either side of the of the weld (240) which may be affected by the heating associated with the LSAW process.

Figure 3:
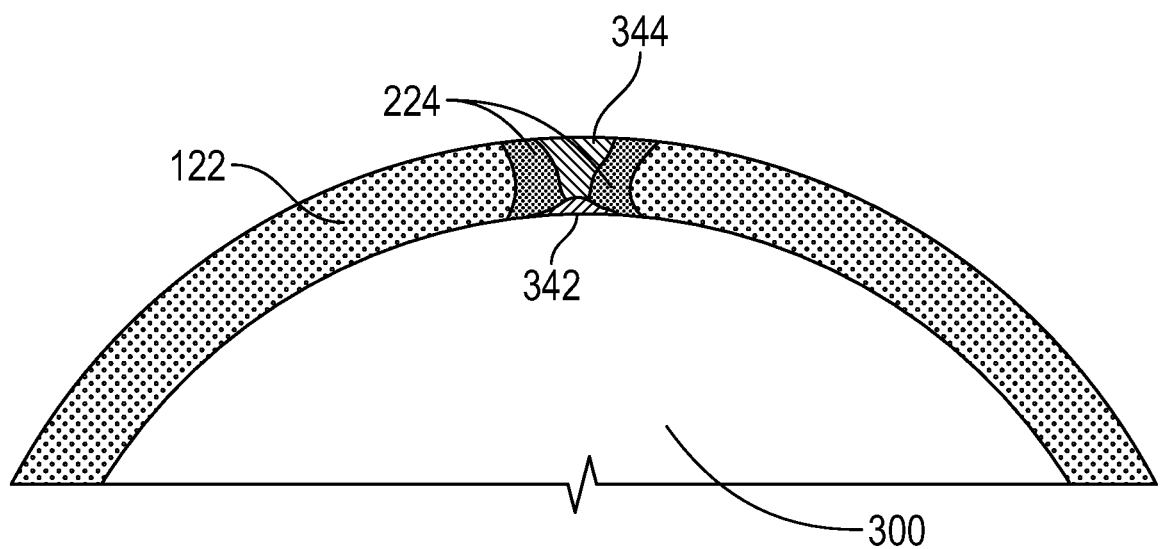
FIG. 3 shows a cross-section through a longitudinal submerged arc weld.

FIG. 3 depicts a cross-section (300) through a portion of a metal pipe (122) containing a weld. The weld may include an inner weld (342) and an outer weld (344). The inner weld (342) may be formed with a LSAW device (200) positioned inside the pipe, and an outer weld (344) may be formed with a LSAW device (200) positioned outside the pipe. A LSAW pipe may have only an inner weld (342), or only an outer weld (344), or both an inner weld (342) and an outer weld (344). Further FIG. 3 depicts the location of the HAZ (224) in cross-section on either side of the LSAW (342, 344).

LSAW generally uses temperatures up to and often exceeding the temperature of melting temperature of the metal of which the pipe is composed, depending on the welding process used. However, the heating and cooling thermal cycle associated with these processes is different from whatever the pipe metal has experienced previously. Thus, the heating and cooling process may lead to a change in of the metal pipe in the HAZ (224) on both side of the inner weld (342) and outer weld (344).

The size of a HAZ (224) is influenced by the level of thermal diffusivity, which is dependent on the thermal conductivity, density and specific heat of the metal of which the pipe is composed, as well as the amount of heat supplied during the welding process. Metals with a high thermal diffusivity may conduct heat more quickly than those with low thermal diffusivity, resulting in faster cooling and, as a result, a smaller HAZ (224). In general, the width of the HAZ (224) is dependent on the amount of heat applied, the duration of exposure to heat, and the properties of the metal of which the pipe is composed. The HAZ (224) is located between the weld and the unaffected metal of which the pipe is composed, but the material within the HAZ (224) is not homogeneous. Different regions within the HAZ (224) have different properties depending on according how close they were to the inner weld (342) or outer weld (344).

If the metal is a conventional steel, the HAZ (224) may be divided into a grain-coarsened zone (closest to the heated area), a grain-refined zone, a partially transformed (intercritically heated) zone, and a tempered zone. In a typical application, the HAZ (224) may extend, for example, for a distance of one inch on either side of the inner weld (342) and the outer weld (344). However, the HAZ (224) also may extend for a distance of less than or great than one inch on either side of the inner weld (342) and the outer weld (344).

Figure 4:
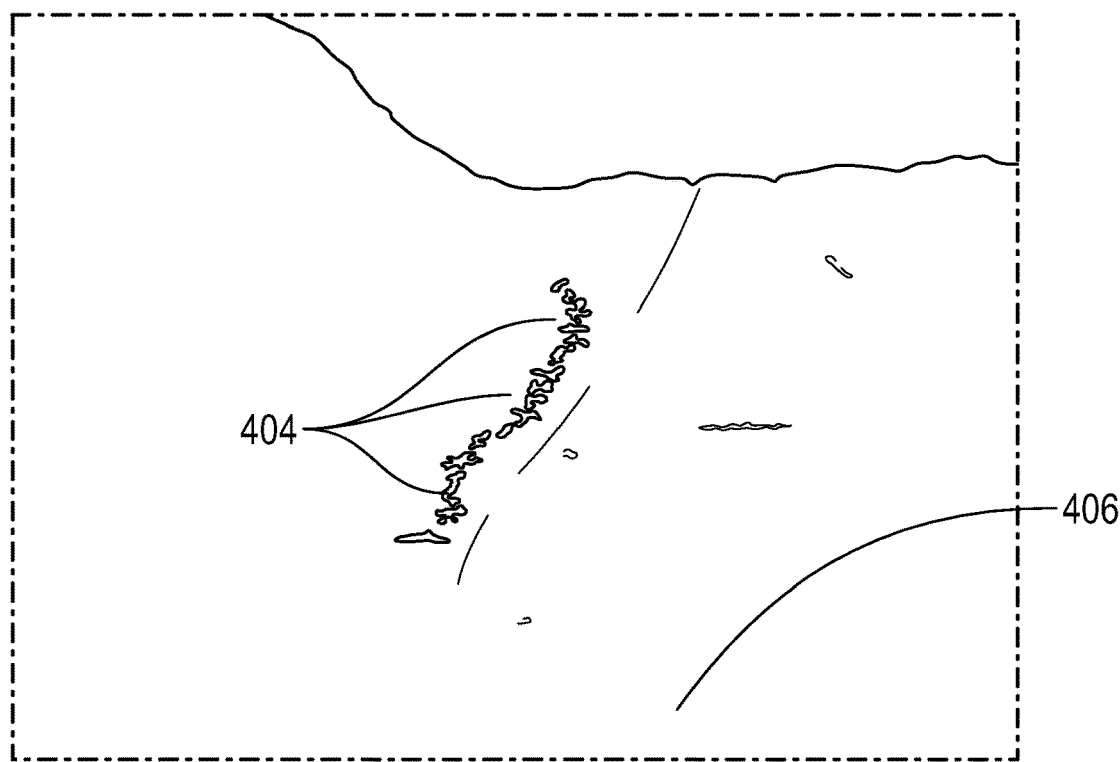
FIG. 4 shows an example of stress-oriented hydrogen induced cracking.

FIG. 4 shows an example of stress-oriented hydrogen-induced cracking (SOHIC) (404) on the interior surface of a metal pipe (406). Free hydrogen atoms may be generated at the internal surface of a pipe (402) as a by-product of wet hydrogen sulfide ($H_2S$) corrosion. HIC and stress-oriented SOHIC may occur when the free hydrogen atoms are adsorbed at the metal surface, permeate the metal and accumulate at trap sites forming $H_2$ gas. The accumulated $H_2$ gas may generate a high internal pressure resulting in the formation of SOHIC (404). The amount of atomic hydrogen formed may depend on the severity of the environment, including pH, $H_2S$ partial pressure, temperature, and the presence of other chemicals, including sulfur and cyanide. SOHIC (404) may often exhibit a morphology of linear cracks parallel to the rolling direction of the metal plate which may cause mechanical structural weakening.

Figure 5:
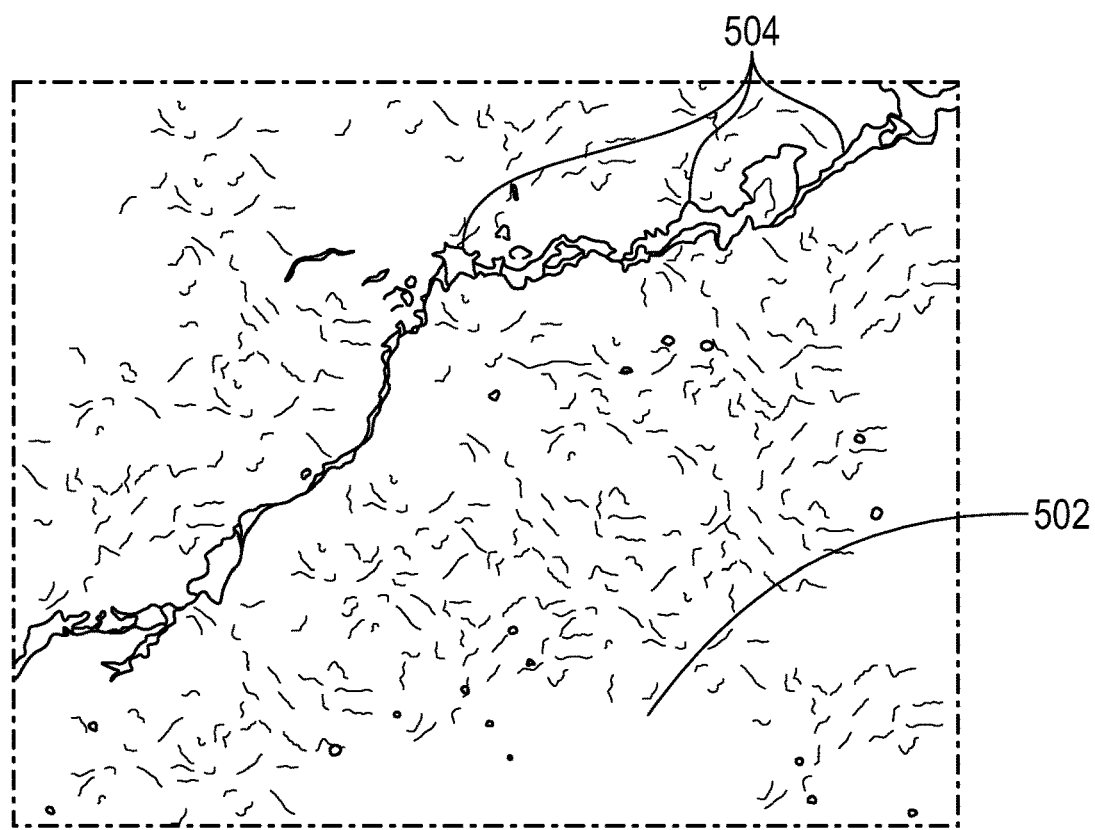
FIG. 5 shows an example of through-thickness cracking.

Through-thickness cracks may have more severe consequences than SOHIC (404) because, in addition to structural weakening, they may permit direct leaking of a pipeline's contents to the environment. FIG. 5 shows an example of through-thickness hydrogen induced cracks (504), visible by optical microscopy, at their intersection with the metal surface (502). Through-thickness hydrogen cracks (504) may be a more common form of failure than SOHIC (404) in the HAZ and metal adjacent to the HAZ.

Figure 6:
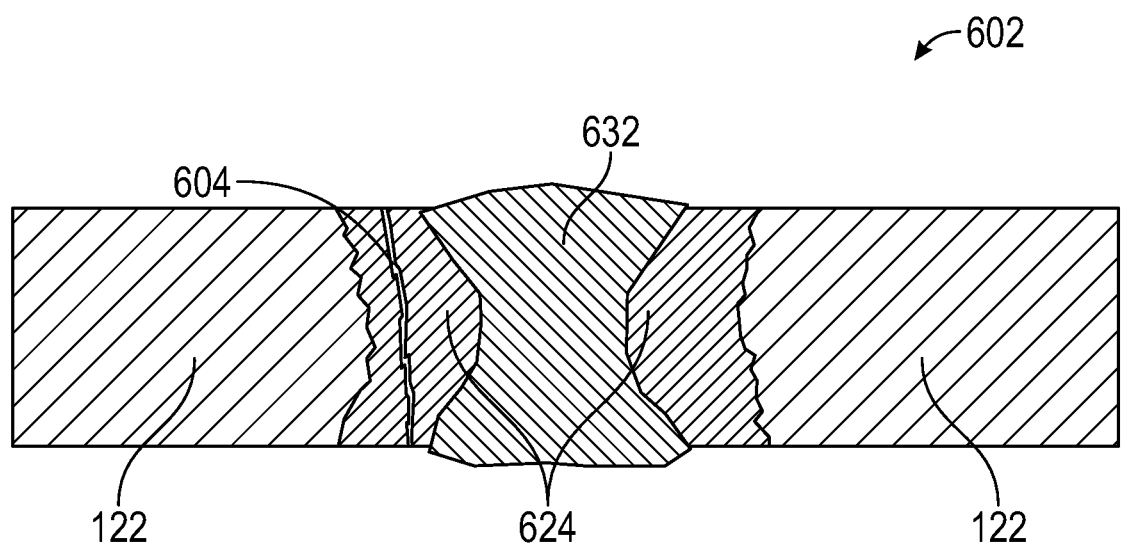
FIG. 6 shows an example of softening of a heat-affected zone.

FIG. 6 depicts a cross-section through a metal sample (602) with an example of a through-thickness crack (604) extending across the entire thickness of the metal sample (602). In this case, the through-thickness crack (604) passes through the HAZ (624). In other cases, through-thickness cracks (604) may form within the weld material (632), or within the metal of which the pipe is composed unaffected by the heat of welding (122).

Figure 7:
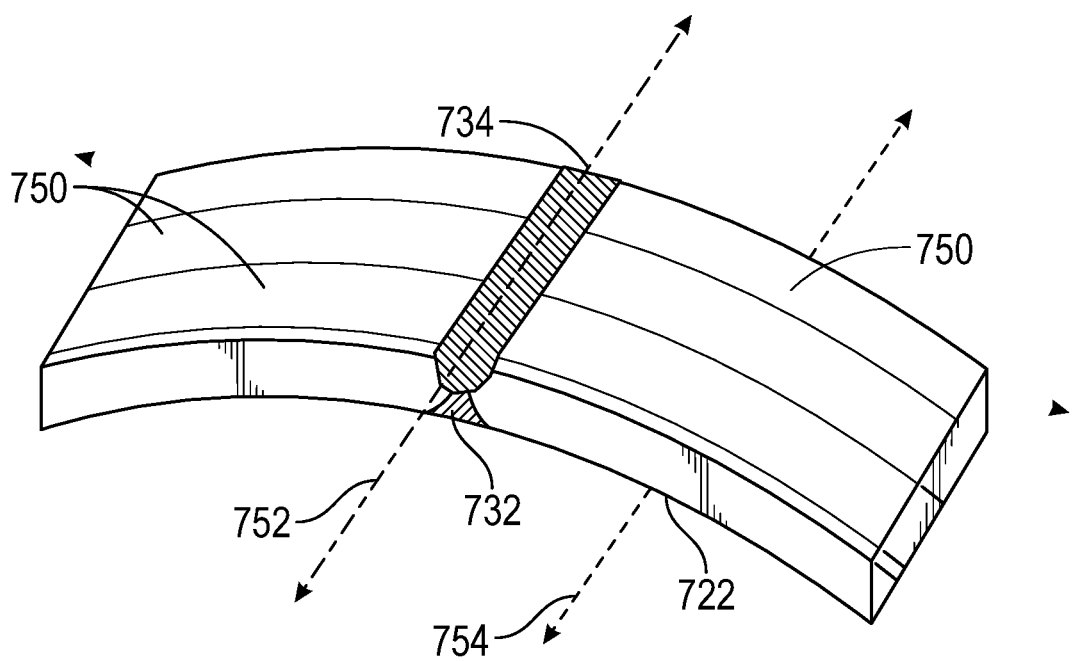
FIG. 7 shows a sampling orientation in accordance with one or more embodiments.

FIG. 7 shows a portion of a metal pipe containing an inner LSAW (732) and an outer LSAW (734). In accordance with one or more embodiments, FIG. 7 illustrates how one or more test samples (750) may be cut from the portion of the metal pipe (722) in such a manner as to ensure that the test samples (750) are symmetrically disposed on either side of the LSAW (732, 734), and the longest dimension of the test sample (750) is perpendicular to both the axis of the LSAW (752) and the axis of rotational symmetry of the pipe (754). In accordance with other embodiments, the test sample may be cut with its longest dimension (750) perpendicular to the axis of the LSAW (752) even when the axis of the LSAW does not lie in the same direction as the axis of rotational symmetry of the pipe (754). While the test samples (750) are shown as arcs of a circle in FIG. 7, they may take any desired shape provided they encompass the LSAW (752).

Figure 8A:
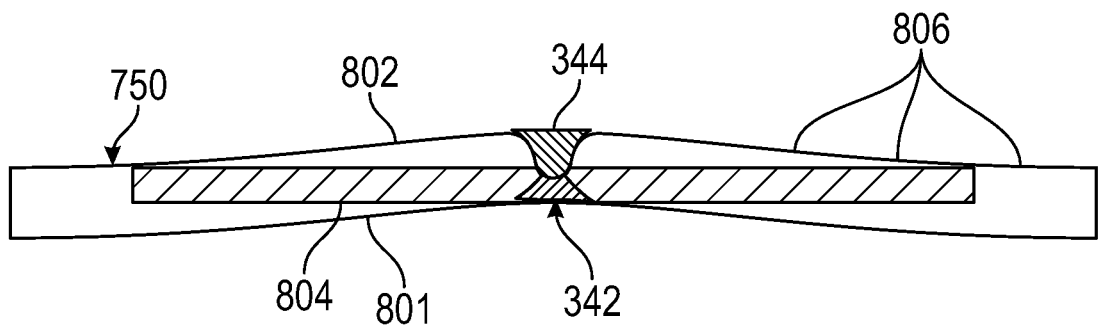
FIGS. 8A and 8B show sample preparation in accordance with one or more embodiments.
Figure 8B:
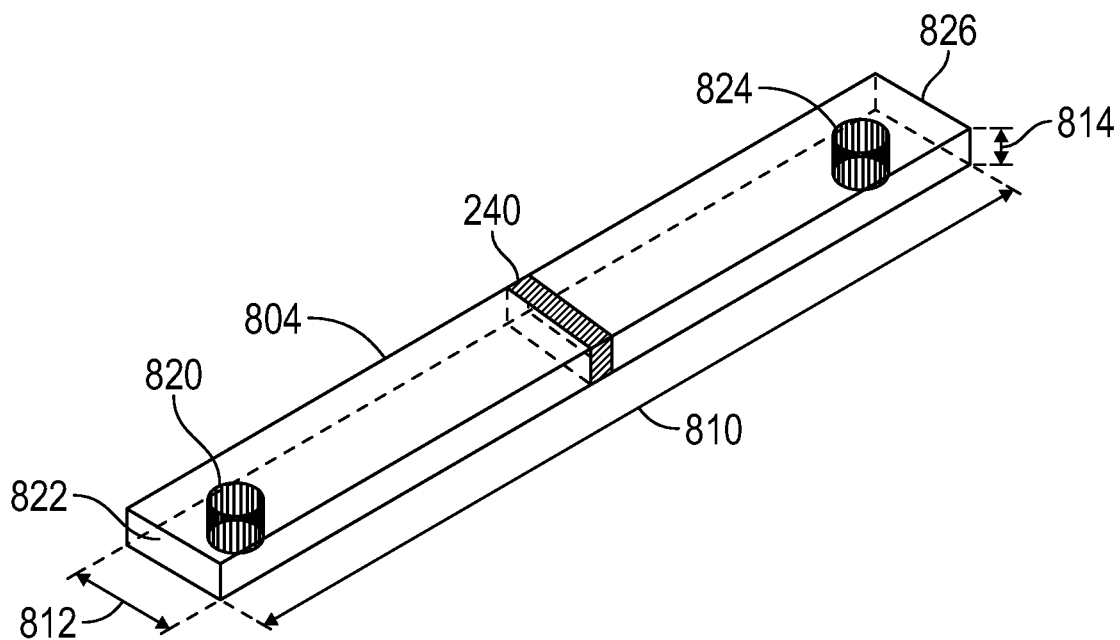

FIGS. 8A and 8B depict formation of test beams (804) from the test sample (750), in accordance with one or more embodiments. FIG. 8A, in accordance with one or more embodiments, depicts the reduction in the curvature (806) of the test sample (750) to facilitate the cutting of a test beam (804), with a cuboidal shape, with a greater length (810) than would be possible without first reducing the curvature (806) of the test sample (750). In accordance with other embodiments, this curvature reduction or "flattening" process may be omitted. The cuboid shape of the test beam may have a longest axis with a length (810) of approximately 6 inches oriented perpendicular to the axis of the LSAW (240), an intermediate axis (812) of approximately 1 inch oriented parallel to the axis of the LSAW, and a shortest axis (814) of approximate 0.2 inches orthogonally to the intermediate axis (812) and the longest axis (810) of the cuboid. The length of these axes (810, 812, and 814) may be larger or smaller than the dimensions stated above, which are only recited for illustration, without departing from the scope of the invention. But, in accordance with one or more embodiments, the individual cuboidal test beams (804) may be 25 mm (1.0 in.) wide, and a minimum of 146 mm (5.75 in.) long. The thickness of the test beams (804) preferably should not be less than 4.6 mm (0.18 in.)

FIG. 8B shows the location of a hole that may be cut through each end of the test beam (804) in a direction parallel to the shortest axis (814) of the cuboid. In accordance with one or more embodiments, a first hole (820) may be cut at a first end (822) of the test beam (804), and a second hole (824) may be cut at a second end (826) of the test beam (804). Furthermore, in accordance with one or more embodiments, the first hole (820) and the second hole (824) may be symmetrically disposed with respect to the LSAW (240) and oriented parallel to the shortest axis (814) of the cuboidal test beam (804). In accordance with one or more embodiments, the distance between the centers of the holes (820, 824) may be 121 mm (4.75 in.).

Figure 9:
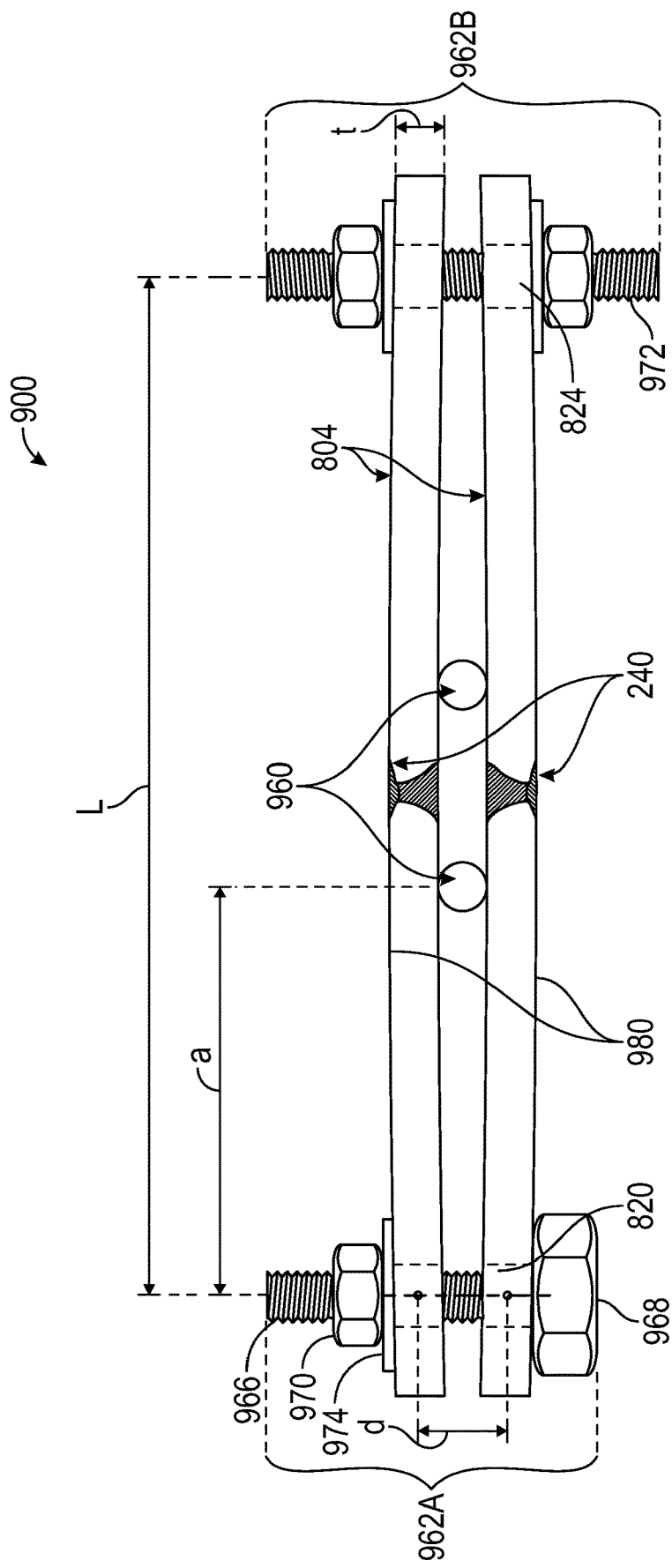
FIG. 9 shows a double-beam assembly in accordance with one or more embodiments.

FIG. 9 shows a double-beam assembly (900) in accordance with one or more embodiments. The double-beam assembly (900) is made from two test beams (804) each with an LSAW (240) located at their center. The two test beams (804) are separated by two spacers (960) disposed symmetrically on either side of the LSAW (240) in each test beam (804). Further, in accordance with one or more embodiments, the two spacers (960) are clamped between the two test beams (804) by fasteners (962A, 962B) applied to the two test beams (804) near their respective ends.

In accordance with one or more embodiments, each fastener (962A, 962B) may include a bolt (964A, 964B) inserted through the holes (820, 824) cut in the end of each test beam. In some embodiments the bolt (966) may have a bolt head (968) at one end, and a nut (970) may be attached to the thread of the bolt (966) at the other end, and thereafter the nut (970) may be tightened to apply a clamping force to the test beams (804) and to the spacers (960) between the test beams (804). In accordance with other embodiments, the bolt may be a headless bolt (972) and a nut (970) may be attached to the thread of the headless bolt (972) at both ends, and thereafter nuts (970) may be tightened to apply a clamping force to the test beams (804) and to the spacers (960) between the test beams (804). In accordance with one or more embodiments, one or more washers (974) may be threaded over the shaft and thread of the bolt (966), such that they are positioned between the head of the bolt and the test beam, or between the nut and the test beam, or both between the bolt head (968) and the test beam (804) and between the nut (970) and the test beam (804).

In accordance with one or more embodiments, the spacers (960) may be cylindrical spacers with circular cross-sections. In other embodiments the spacers (960) may be cylinders with elliptical cross-sections. Furthermore, spacers (960) with cross-sections of shapes other than circles or ellipses may be readily understood by one of ordinary skill in the art, without departing from the scope of the invention.

Although an embodiment of a clamp using a combination of bolts (968, 972) and one or more nuts (970) is illustrated in FIG. 9, it will be readily understood by one of ordinary skill in the art that many other clamping mechanisms may be used as alternatives. No limitation in the scope of the invention is intended or implied by the embodiment of the clamp illustrated. Furthermore, different types of clamps may be employed at either end of the test beams (904) without departing from the scope of the invention.

FIG. 9 also illustrates some dimensions. The distance between the center of the two clamps is denoted L, and the distance between the center of each clamp and the center of the spacer closest to the clamp is denoted a. The thickness of the test beams is denoted t, and the separation between the center of the shortest axis of the two cuboidal test beams is denoted d.

In accordance with one or more embodiments, the two test beams (904) may be stressed by the fasteners (962A, 962B) at each end of the double-beam assembly (900) to produce a deflection of the test beams (804) towards one another at their ends. This deflection may produce a tensile stress on the outer surface (980) of each test beam. In accordance with one or more embodiments, the deflection may be produced by tightening one or more nut (970) on one or more bolts (968, 972). In accordance with one or more embodiments, the nuts (970) at each end of the double-beam assembly (900) may be tightened in a symmetrical manner to ensure an equal value of the distance d, at each end. The deflection, Δd, may be related to the tensile stress using the relationship:

$$\Delta d = \frac{2Sa}{3Et}(3L - 4a) \qquad \text{Equation (1)}$$

where d, L, t, and Δd, are all stated in consistent units, for example, all the measurements are stated in millimeters or all the measurements are stated in inches. E is the elastic modulus for the pipe material, and S is the desired tensile stress at the outer surfaces (980) of each test beam (804). In accordance with one or more embodiments the S may be specified as fraction of the specified minimum yield strength (SMYS). A typical value for the elastic modulus of steel is 204 gigapascals (GPA) or equivalently 300 kilo pounds per square inch (kpsi). The minimum yield strength of the material of which the pipe is composed is defined as the tensile stress required to produce a total elongation of 0.5%. The SMYS is the nominal minimum yield strength for the material specified by the manufacturer. In accordance with one or more embodiments, S may be predetermined to be a value greater than 50% of the SMYS.

Figure 10:
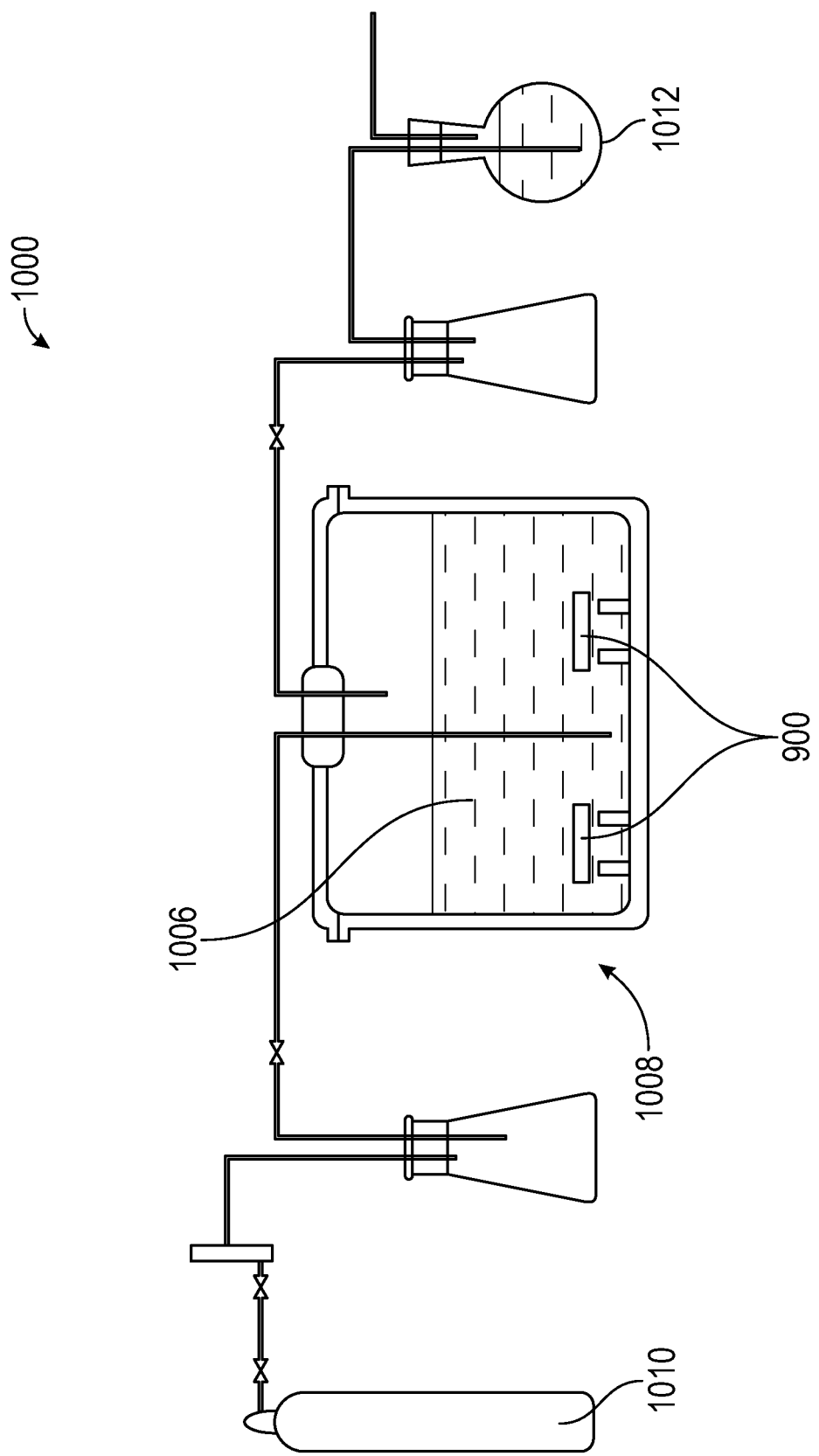
FIG. 10 shows immersion of a sample in a test solution in accordance with one or more embodiments.

FIG. 10 depicts a test apparatus (1000) for submerging the double-beam assembly (900) in a test solution (1006) in accordance with one or more embodiments. The test apparatus (1000) may be similar to the test apparatus (1000) described in "*Laboratory Test Procedures for Evaluation of SOHIC Resistance of Plate Steels Used in Wet $H_2S$ Service, NACE Standard TM0103-2003 Item No. 21242*", published by the National Association of Corrosion Engineers. In accordance with one or more embodiments, the double-beam assembly (900) may be submerged in a test solution (1006) contained in any convenient airtight test vessel (1008) large enough to contain the test specimens with provisions for purging and introduction of $H_2S$.

In accordance with one or more embodiments, the volume of the test vessel (1008) should be sufficient to maintain a test solution (1006) volume of at least 3 mL/cm$^2$ (0.67 oz fluid/in$^2$) of exposed test beam (804) surface area. The test vessel (1008) should be constructed from materials that are inert to the test solution (1006). In accordance with one or more embodiments, a glass or a corrosion-resistant alloy test vessel (1008) may be used. Further, in accordance with one or more embodiments, the double-beam assembly (900) may be electrically isolated from any other dissimilar metals in contact with the test solution (1006). In accordance with one or more embodiments, the test solution may comprise an H$_2$S-saturated aqueous environment using reagent grade chemicals with a minimum 99.5% purity. The water added to the test solution (1006) may be distilled or deionized and of quality equal to or greater than ASTM D-1193 Type IV. An inert gas may be used for removal of oxygen, such as high-purity nitrogen, argon, or helium.

In accordance with one or more embodiments, the test solution (1006) volume to test beam (804) exposed surface area ratio shall be maintained and care may be taken to exclude oxygen from the test vessel (1008) to produce controlled conditions of pH and hydrogen charging.

In accordance with one or more embodiments, reagents to be added to the test solutions (1006) may be measured to an accuracy of ±1.0% of the quantities specified by the test solution (1006). The test solution may, for example, be 5.0% by weight of NaCl and 0.5% by weight of glacial acetic acid dissolved in distilled or deionized water and then saturated with H$_2$S gas at 100 kPa (1 atm). In accordance with one or more embodiments, when saturated with H$_2$S the test solution will have an initial acidity in the range of 2.7 to 3.3 pH units. During the test, the acidity may alter, but should not be allowed to change by more than ±0.2 pH units. This may be achieved by periodically regenerating the buffering power of the test solution (1006) by pH adjustment by addition of H$_2$S from and attached H$_2$S reservoir (1010), or NaCl from an attached NaCl reservoir (1012). In addition, the exclusion of oxygen from the test during pH adjustment should be ensured. Details of pH adjustment during the test should be recorded. In accordance with one or more embodiments, the pH of the test solution may be measured and recorded at the end of the test. The pH shall not exceed 4.0 for the test to be considered valid.

In accordance with one or more embodiments, the double-beam assembly (1004) may be submerged in the test solution (1006) for a predetermined period of time. For example, the predetermined period of time may be between 4 hours and 168 hours. In accordance with one or more embodiments, the predetermined period of time is 96 hours. During the submersion of the double-beam assembly (900) the temperature of the test solution may be maintained within a predetermined range. The predetermined temperature range may be between 22 and 28.5° C., or equivalently between 72 and 83° F.

After submersion for the predetermined period of time, in accordance with one or more embodiments, the double-beam assembly (900) may be disassembled, and each exposed test beam (804) cleaned to remove scale and deposits. Exposed test beams (804) may be cleaned with detergent and a wire brush or may be lightly sandblasted. Exposed test beams (804) should not be cleaned with acid or by any other means that might promote hydrogen absorption.

Figure 11:
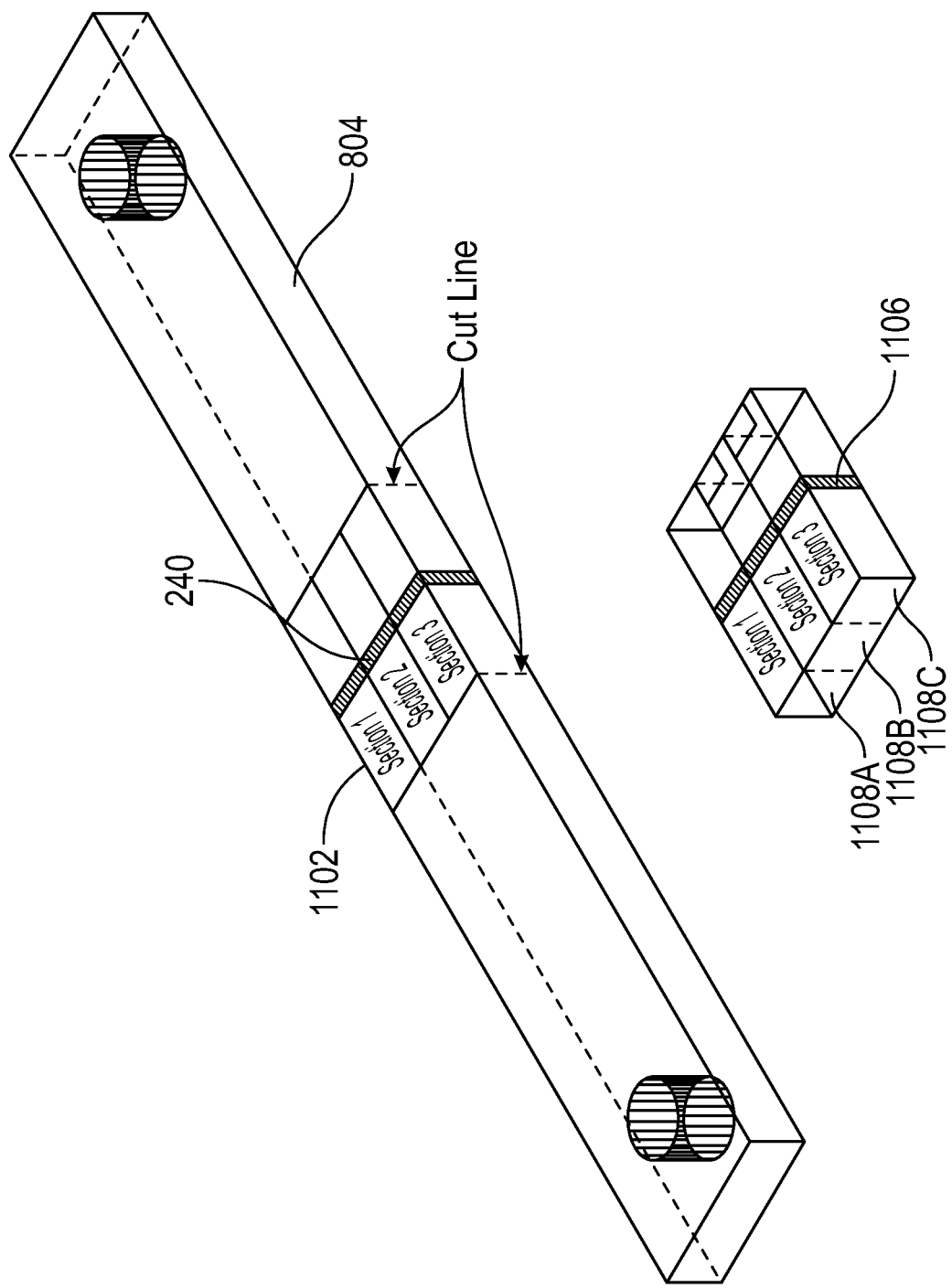
FIG. 11 shows post-immersion sectioning of the sample in accordance with one or more embodiments.

In FIG. 11, in accordance with one or more embodiments, after cleaning, each exposed test beam (804) may be metallographically sectioned for examination in the following manner. Each test beam (804) specimen may be sectioned for examination. A portion of each test beam may be separated from the remainder by cutting along planes (1104) parallel to the LSAW (240). The portion of the test beam sectioned for metallography examination (1102) must contain the LSAW (240). Each portion of the test beam sectioned for metallographic examination (1102) should be cut into a number of sections (1108A, 1108B, 1108C). In accordance with one or more embodiments, the portion of the test beam sectioned for metallographic examination (1102) may be cut into three sections (1108A, 1108B, 1108C).

Each section (1108A, 1108B, 1108C) may be metallographically polished, and etched if necessary, so that cracks can be distinguished from small inclusions, laminations, scratches, or other discontinuities. Only a light etch should be used as a heavy etch may obscure small cracks. A metallographic preparation method that does not smear the metal surfaces such that significant cracks may become invisible should be used. Thereafter, all faces to be examined shall be subjected to either wet magnetic particle testing or macro-etching prior to final metallographic polishing.

An alternative preparation procedure to that described in the previous paragraph may be used provided that it has been proven to result in clearly visible cracks (if present) after final polishing, and a detailed written description of the procedure is recorded.

Visible cracks should be measured and reported in a written report. In measuring crack length and thickness, cracks separated by less than 0.5 mm (0.002 in) should be considered a single crack. All identifiable cracks visible at magnifications up to 100× should be included in the written report, except those that lie entirely within 1.0 mm (0.04 in) of the internal or external surface of the test specimen. It may be necessary to examine some sections at higher magnifications to distinguish between small cracks, inclusions, pits on the side surfaces, or other discontinuities.

The crack sensitivity ratio (CSR), crack length ratio (CLR), and crack thickness ratio (CTR) may be calculated and reported for each of the three sections from each test beam, and for each individual test beam as the average of its three sections. The crack sensitivity ratio (CSR), crack length ratio (CLR), and crack thickness ratio (CTR) are defined in accordance with "*Evaluation of Pipeline and Pressure Vessel Steels for Resistance to Hydrogen-Induced Cracking TM0284-2016*", published by the National Association of Corrosion Engineers.

Figure 12:
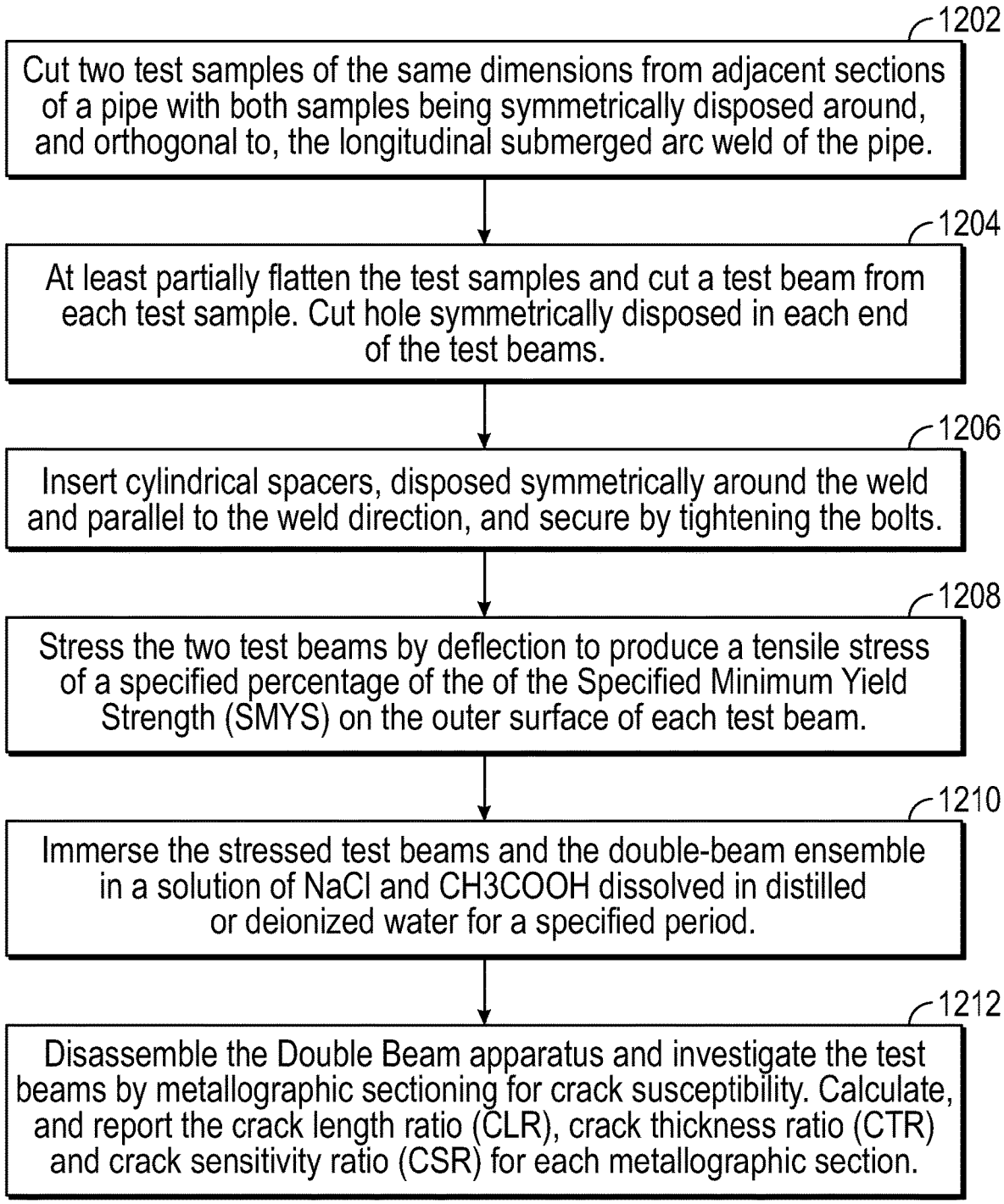
FIG. 12 shows a flowchart in accordance with one or more embodiments.

FIG. 12 shows a flowchart in accordance with one or more embodiments. In Step 1202 two test samples having the same dimensions are cut from adjacent sections of a metal pipe. Both samples are selected to be symmetrically disposed around, and orthogonal to, the LSAW (240) of the pipe (122). Each test sample (750) has a LSAW (240) at the center of their longest axis and the LSAW (240) runs perpendicular to the longest axis of the test sample.

In Step 1204, in accordance with one or more embodiments, each test sample (750) may be at least partially flattened to reduce the curvature (806) of each test sample (750). Alternatively, or in addition, the inner surface (801) or the outer surface (802) for each test sample (750) may be cut or milled to reduce curvature. A test beam (804) having a cuboidal cross-section may be cut from each test sample (750), in such a manner as to ensure that the LSAW (240) is positioned at the center of the longest axis of the test beam and the LSAW (240) runs perpendicular to the longest axis of the test beam. A hole may be cut through each end of each test beam (804), each hole having a circular cross-section and an axis of rotation parallel to the shortest axis of the test beam (804).

In Step 1206, in accordance with one or more embodiments, spacers may be inserted between the test beams, disposed symmetrically around the LSAW (240) at the center of each test beam (804) and perpendicular to the longest axis of each test beam (804). The spacers (960) may be cylindrical spacers, according to some embodiments. According to one or more embodiments, the spacers (960) used in the double-beam assembly (900) shall cylindrical with a 6.4 mm (0.25 in.) diameter, and spaced 38 mm (1.5 in.) apart when measured center-to-center, each placed between the two test beams (804) at positions 19 mm (0.75 in.) from the middle of the test beams (804). All dimensions with the exception of the length shall be held within a tolerance of ±0.13 mm (±0.005 in.).

In accordance with one or more embodiments, in Step 1208 the two test beams (804) may be stressed by deflection to produce a tensile stress of a predetermined fraction of the of the Specified Minimum Yield Strength (SMYS) on the outer surface of each test beam. In accordance with one or more embodiments, the predetermined tensile stress may be predetermined to be a value of 50% of the SMYS. In accordance with other embodiments, the predetermined tensile stress may be predetermined to be a value greater than 50% of the SMYS.

In Step 1210, in accordance with one or more embodiments, the stressed test beams in the double-beam assembly (900) may be immersed in a test solution (1006) of NaCl and CH3COOH dissolved in distilled or deionized water for a predetermined period of time. In some embodiments, the test solution (1006) may comprise 5.0% by weight of NaCl and 0.5% by weight of glacial acetic acid dissolved in distilled or deionized water and then saturated with $H_2S$ gas at 100 kPa (1 atm). In one or more embodiments, the period of time over which the double-beam assembly (900) is submerged may be 96 hours.

In Step 1212, in accordance with one or more embodiments, the double beam assembly (900) may be removed from the test solution (1006) and disassembled. The test beams (804) may then be examined by metallographic sectioning for the presence of through-thickness cracks. The cleaned and prepared surfaces of each metallographic section may be examined visually and using visual microscopy, and the presence or absence of any through thickness cracks reported. The crack length ratio (CLR), crack thickness ratio (CTR) and crack sensitivity ratio (CSR) for each metallographic section may be calculated and reported.

Although only a few example embodiments have been described in detail above, those skilled in the art will readily appreciate that many modifications are possible in the example embodiment without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method, comprising:
   obtaining a metal pipe with a longitudinal submerged arc weld, an axis of the longitudinal submerged arc weld being oriented parallel to a rotationally symmetric axis of the metal pipe;
   cutting a first test beam and a second test beam from the metal pipe, wherein each test beam extends on both sides of the axis of the longitudinal submerged arc weld and each test beam has a cuboid shape;
   forming a double-beam assembly by clamping two spacers between the first test beam and the second test beam such that the two spacers are symmetrically disposed at an equal distance on either side the longitudinal submerged arc weld;
   immersing the double-beam assembly in a liquid test solution for a predetermined period of time;
   removing the double-beam assembly from the liquid test solution;
   disassembling the double-beam assembly by releasing the clamping; and
   examining the first test beam and the second test beam using a metallographic sectioning method.

2. The method of claim 1, wherein each of the first test beam and the second test beam comprises:
   a portion of a longitudinal submerged arc weld deposit;
   a heat-affected zone of the metal pipe on both sides of the weld deposit; and
   a portion of the metal pipe on both sides of the weld deposit unaffected by heat associated with a welding process.

3. The method of claim 1, wherein cutting the first test beam and the second test beam from the metal pipe comprises:
   cutting a first test sample and a second test sample from the metal pipe;
   reducing a curvature of the first test sample;
   cutting the first test beam from the first test sample;
   reducing a curvature of the second test sample; and
   cutting the second test beam from the second test sample.

4. The method of claim 1, wherein the cuboid shape of the first test beam is identical in all dimensions to the cuboid shape of the second test beam.

5. The method of claim 1, wherein each spacer comprises a cylindrical spacer and wherein a rotationally symmetric axis of each spacer is oriented parallel to the axis of the longitudinal submerged arc weld.

6. The method of claim 1, wherein forming the double-beam assembly further comprises:
   drilling a first hole through a first end of each test beam and a second hole through a second end of each test beam, such that the first hole and second hole are symmetrically disposed on either side of the center of a longest axis of each test beam;
   inserting a first fastener through the first hole of each test beam;
   inserting a second fastener through the second hole of each test beam; and
   tightening the first fastener and the second fastener to produce a deflection of the first beam and a deflection of the second beam about the two spacers.

7. The method of claim 6, wherein each of the first fastener and the second fastener comprises a bolt and at least one nut.

8. The method of claim 6, wherein the deflection produces a predetermined value of a tensile stress on an exterior side of each test beam.

9. The method of claim 8, wherein the predetermined value of the tensile stress is a predetermined percentage of a minimum yield stress of the metal of the metal pipe.

10. The method of claim 9, wherein the predetermined percentage of a minimum yield stress of the metal of the metal pipe is greater than 50 percent.

11. The method of claim 1, wherein the liquid test solution is an acidified brine solution comprising sodium chloride (NaCl) and acetic acid (CH3COOH) dissolved in distilled or deionized water saturated with $H_2S$ at ambient temperature.

12. The method of claim 11, wherein the acidified brine solution comprises 5.0% sodium chloride and 0.5% acetic acid.

13. The method of claim 1, wherein the predetermined period of time is selected within a time range bounded by 4 hours and 168 hours.

14. The method of claim 1, wherein examining the first test beam and the second test beam using metallographic sectioning further comprises:
    inspecting an exterior surface of each test beam using an optical microscope;
    sectioning each test beam along a plane perpendicular to the weld to create a plurality of sectioned surfaces;
    polishing the plurality of sectioned surfaces; and
    inspecting the plurality of sectioned surfaces using an optical microscope.

15. The method of claim 14, wherein inspecting further comprises searching for through-thickness cracks.

16. The method of claim 14, further comprising:
    etching at least one of the plurality of sectioned surfaces with an acidic liquid to create an etched surface; and
    inspecting the etched surface using an optical microscope.

17. The method of claim 15, further comprising:
    identifying each through-thickness crack visible by optical microscopy on the exterior and sectioned surfaces of each test beam; and
    reporting each identified through-thickness crack.

18. A testing apparatus, comprising:
    a first test beam and a second test beam both cut from a single metal pipe having a longitudinal submerged arc weld therein, wherein each test beam includes a portion of the longitudinal submerged arc weld and portions of the metal pipe extending on both sides of the longitudinal submerged arc weld;
    two spacers positioned between the first test beam and the second test beam and positioned equidistant from the portion of the longitudinal submerged arc weld; and
    two clamps that clamp respective distal end portions of the first test beam and the second test beam together, wherein the two clamps are selectively tightenable to cause a desired deflection of the first and second test beams around the two spacers.

19. The testing apparatus of claim 18, wherein each of the two clamps comprises a fastener inserted through a hole in one of the distal end portions of the first test beam and the second test beam.

20. The testing apparatus of claim 18, further comprising:
    a container of acidified brine solution in which the first and second test beams, the two spacers, and the two clamps are submerged.

* * * * *